(12) United States Patent
Wang et al.

(10) Patent No.: US 8,587,932 B2
(45) Date of Patent: Nov. 19, 2013

(54) HANDHELD ELECTRONIC DEVICE

(75) Inventors: Chun-Ping Wang, Hsin-Chu (TW); Chi-Chen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 218 days.

(21) Appl. No.: 12/962,664

(22) Filed: Dec. 8, 2010

(65) Prior Publication Data

US 2011/0222216 A1  Sep. 15, 2011

(30) Foreign Application Priority Data

Mar. 15, 2010 (CN) .......................... 2010 1 0132768

(51) Int. Cl.
*H05K 7/00* (2006.01)
*G06F 1/16* (2006.01)
*H04M 1/00* (2006.01)

(52) U.S. Cl.
USPC ............ 361/679.01; 361/679.02; 361/679.32; 361/679.55; 361/679.56; 361/679.59; 361/755; 455/575.1

(58) Field of Classification Search
USPC ................. 361/679.01, 684; 24/115
See application file for complete search history.

(56) References Cited

U.S. PATENT DOCUMENTS

| 6,655,540 | B2 | 12/2003 | Shimoda et al. |
| 7,403,706 | B2* | 7/2008 | Nakao et al. ................... 396/176 |
| 2005/0157462 | A1* | 7/2005 | Sugawara et al. ............. 361/684 |
| 2006/0045485 | A1* | 3/2006 | Kawamura ....................... 386/95 |
| 2009/0086440 | A1* | 4/2009 | Takahama ..................... 361/724 |
| 2010/0014246 | A1* | 1/2010 | Chen ........................ 361/679.56 |

FOREIGN PATENT DOCUMENTS

| CN | 1231105 | 10/1999 |
| CN | 1322108 | 11/2001 |
| CN | 101277596 | 10/2008 |
| TW | M288755 | 3/2006 |
| TW | I256822 | 6/2006 |

OTHER PUBLICATIONS

"First Office Action of China Counterpart Application" with English translation thereof, issued on Feb. 27, 2013, p. 1- p. 9.

* cited by examiner

*Primary Examiner* — Tuan T Dinh
*Assistant Examiner* — Mukund G Patel
(74) *Attorney, Agent, or Firm* — Jianq Chyun IP Office

(57) ABSTRACT

A handheld electronic device includes a main body and a cover. The main body has a bottom surface and a side surface adjacent to each other. A strap hole is formed in the side surface of the main body. A receiving slot and an observing opening are formed in the bottom surface. The observing opening is located at an edge of the bottom surface and is aligned and communicates with the strap hole. The cover is detachably disposed on the bottom surface to cover the receiving slot and the observing opening.

4 Claims, 5 Drawing Sheets

HANDHELD ELECTRONIC DEVICE

CROSS-REFERENCE TO RELATED APPLICATION

This application claims the priority benefit of Chinese application serial no. 201010132768.6, filed on Mar. 15, 2010. The entirety of the above-mentioned patent application is hereby incorporated by reference herein and made a part of this specification.

BACKGROUND OF THE INVENTION

1. Field of the Invention

The invention relates to a handheld electronic device, and more particularly, to a handheld electronic device having a strap hole.

2. Description of Related Art

Handheld electronic devices, such as, mobile phones, multi-media players, personal digital assistants (PDAs), Pico projectors, or the like, have become ordinary people's daily use products because they are small in size and easy to carry and use. Taking the mobile phone as an example, in addition to the basic communication function, the mobile phone can also have the functions of video capturing and audio/video playback. Further, following the development of the wireless network technology, the mobile phone can also be used to visit the internet allowing the user to search for information online.

In addition, in order to provide a variable appearance of the handheld electronic device, a strap hole may be formed in a housing of the handheld electronic device, which allows a user to hang various charms that interest him/her on the handheld electronic device. However, the user often needs to take much time and efforts to complete the passing of the strap of the charm through the strap hole because the user cannot observe the strap in the strap hole during the course of passing the strap through the strap hole. Taiwan Patent No. TWM288755 discloses related techniques for strap hole.

SUMMARY OF THE INVENTION

Accordingly, the invention is directed to a handheld electronic device which allows the user to easily install a charm on the handheld electronic device.

Other advantages and objects of the invention may be further comprehended through the technical features disclosed in the invention.

In order to achieve one or part of or all the objectives or other objectives, a handheld electronic device including a main body and a cover is provided in one embodiment of the invention. The main body has a bottom surface and a side surface adjacent to each other. A strap hole is formed in the side surface of the main body. A receiving slot and an observing opening are formed in the bottom surface. The observing opening is located at an edge of the bottom surface and is aligned and communicates with the strap hole. The cover is detachably disposed on the bottom surface to cover the receiving slot and the observing opening.

In one embodiment, the handheld electronic device further includes a bar connected between a top wall and a bottom wall of the strap hole.

In one embodiment, the bar and the main body are integrally formed.

In one embodiment, the receiving slot is a battery slot.

In one embodiment, the cover includes a positioning protrusion engagingly received in the observing opening.

In one embodiment, the cover includes a hook. The main body includes a rib in the observing opening. The hook is engaged with the rib.

In view of the foregoing, the above embodiments of the invention have at least one of the following advantages. The handheld electronic device has the observing opening aligned with and communicating with the strap hole. During the course of passing the charm strap through the strap hole by the user, the user may observe the strap in the strap hole through the observing opening, or adjust the position of the strap in the strap hole through the observing opening, thus facilitating the quick installing of the charm. In addition, the observe opening and the receiving slot are both positioned at the bottom surface of the main body. Therefore, after the strap has passed through the strap hole, the cover used to cover the receiving slot can also cover the observing opening. This avoids exposure of the observing opening which affects the appearance of the handheld electronic device.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purposes of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
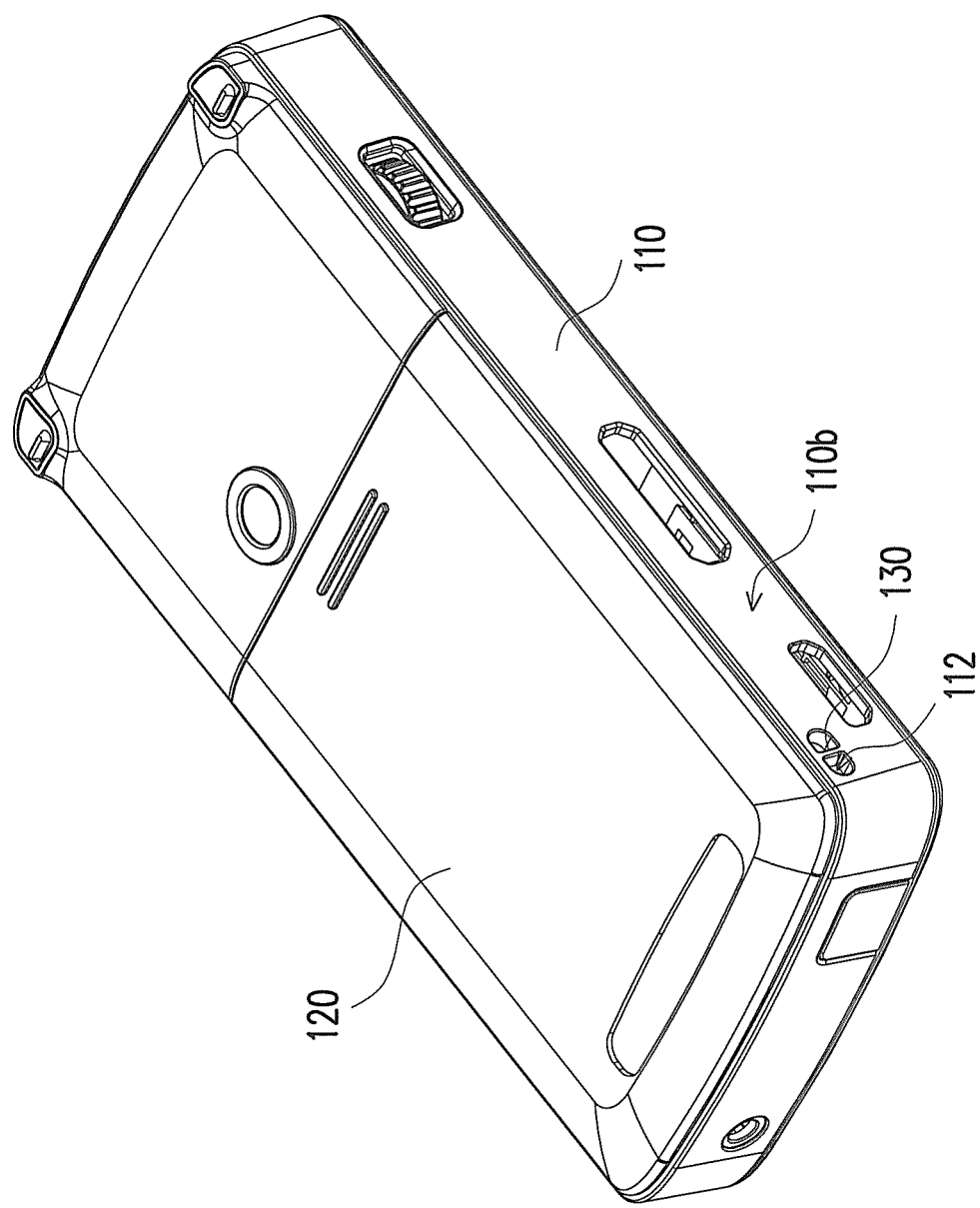
FIG. 1 is a perspective view of a handheld electronic device according to one embodiment of the invention.
Figure 2:
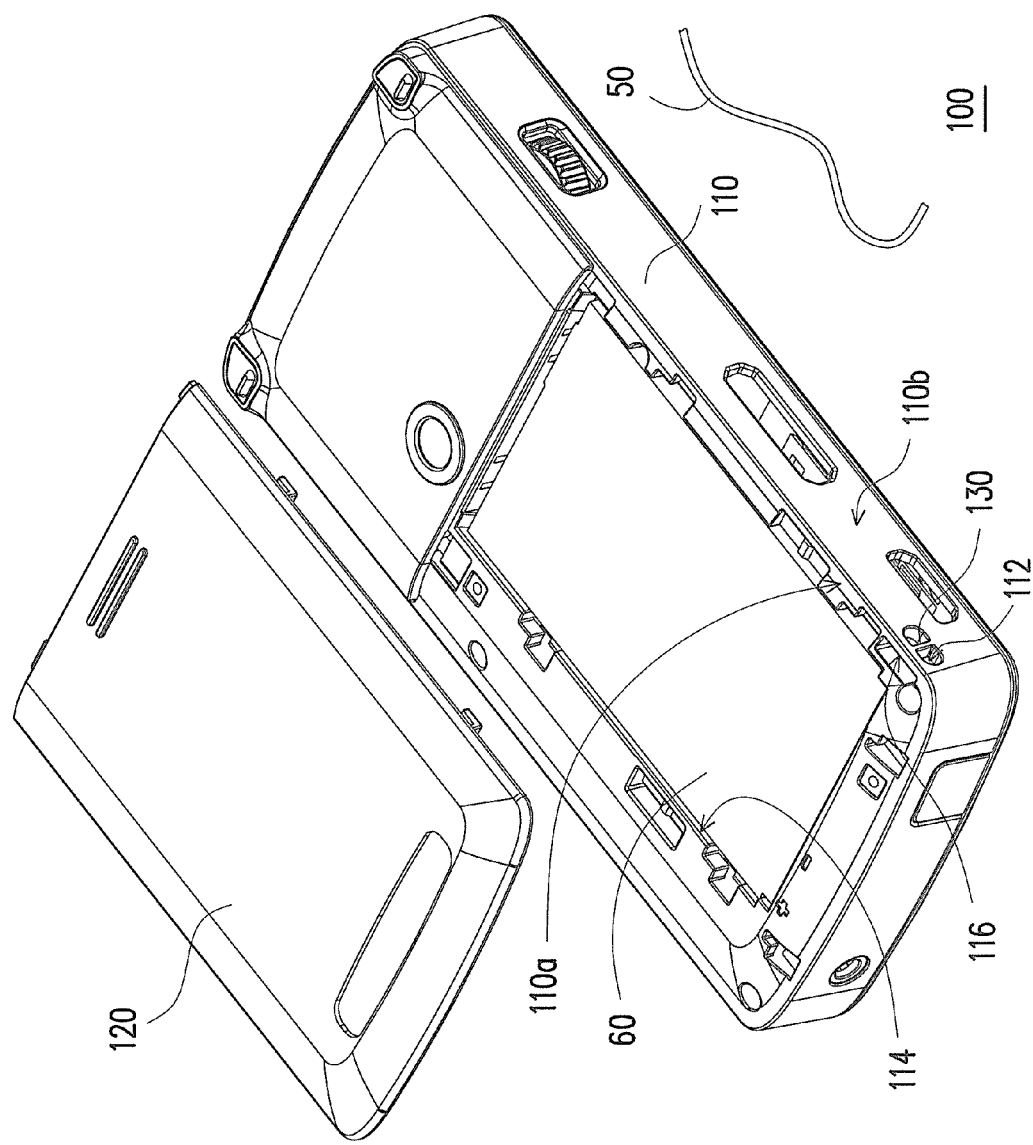
FIG. 2 is a perspective view of a cover and a main body of the handheld electronic device that are in a separated state.

FIG. 1 is a perspective view of a handheld electronic device according to one embodiment of the invention. FIG. 2 is a perspective view of a cover and a main body of the handheld electronic device that are in a separated state. Referring to FIGS. 1 and 2, the handheld electronic device 100 of the present embodiment is, for example, a pico projector. The handheld electronic device 100 includes a main body 110 and a cover 120. The main body 110 includes a bottom surface 110a and a side surface 110b adjacent to each other. A strap hole 112 is formed in the side surface 110b of the main body 110. A receiving slot 114 and an observing opening 116 are formed in the bottom surface 110a. The observing opening 116 located at an edge of the bottom surface 110a is aligned with and communicates with the strap hole 112. The cover 120 is detachably mounted on the bottom surface 110a to cover the receiving slot 114 and the observing opening 116.

As such, during the course of passing a strap 50 of a charm through the strap hole 112 by a user (the strap 50 has not been slided through the strap hole 112), the user may directly observe the strap 50 in the strap hole 112 through the observing opening 116, or adjust the position of the strap 50 in the strap hole 112 through the observing opening 116, thus facilitating a quick installing of the charm. In addition, the observing opening 116 and the receiving slot 114 are both disposed at the bottom surface 110a of the main body 110. Therefore, after the strap 50 has been passed through the strap hole 112, the cover 120 used to cover the receiving slot 114 may also cover the observing opening 116 (as shown in FIG. 1). This avoids exposure of the observing opening 116 which affects the appearance of the handheld electronic device 100.

Referring to FIG. 2, in the present embodiment, the receiving slot 114 is, for example, a battery slot adapted to receive a battery 60. However, this should not be regarded as limiting. The receiving slot 114 may also be another suitable slot. In addition, the invention is not intended to limit the handheld electronic device 100 to any particular type. In addition to being the Pico projector, the handheld electronic device 100 may also be a mobile phone, a multi-media player, a personal digital assistant, or the like.

Figure 3:
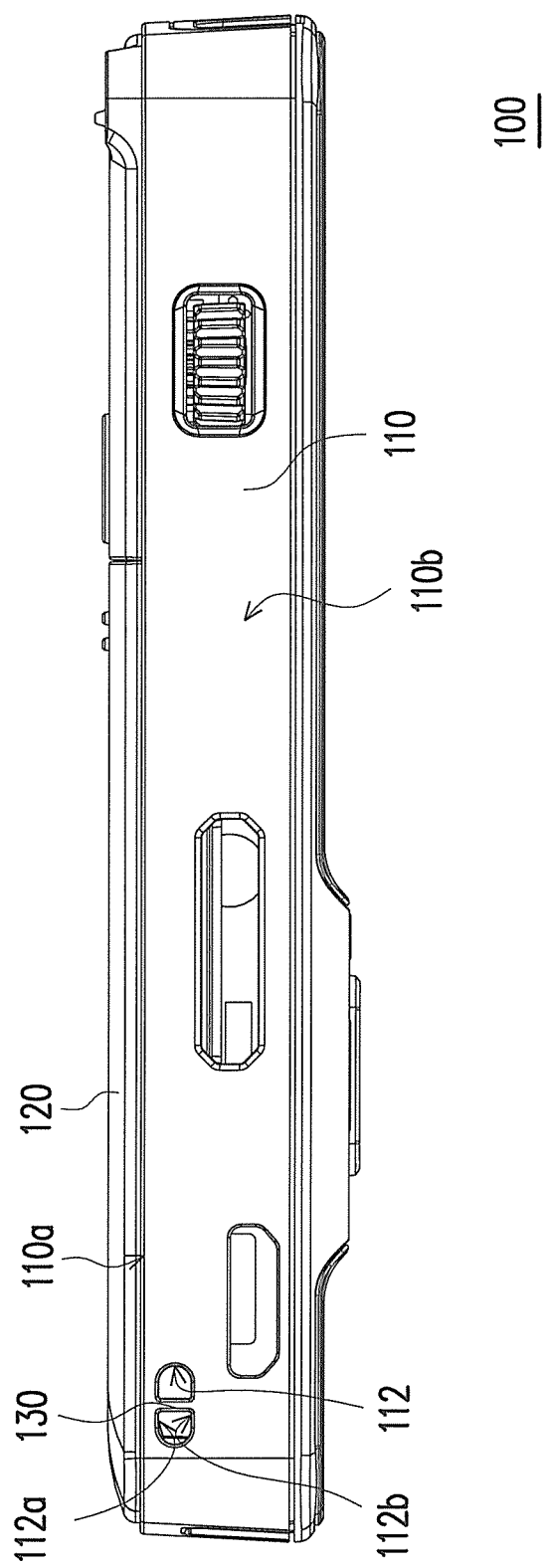
FIG. 3 is a side view of the handheld electronic device of FIG. 1.

FIG. 3 is a side view of the handheld electronic device of FIG. 1. Referring also to FIG. 3, specifically, the handheld electronic device of the present embodiment further includes a bar 130. The bar 130 is connected between a top wall 112a and a bottom wall 112b of the strap hole 112. The user may attach the strap 50 around the bar 130 to complete the installing of the charm. More specifically, the bar 130 and the main body 110 of the present embodiment may, for example, be integrally formed, thereby simplifying the fabrication and reducing the fabrication cost.

Figure 4A:
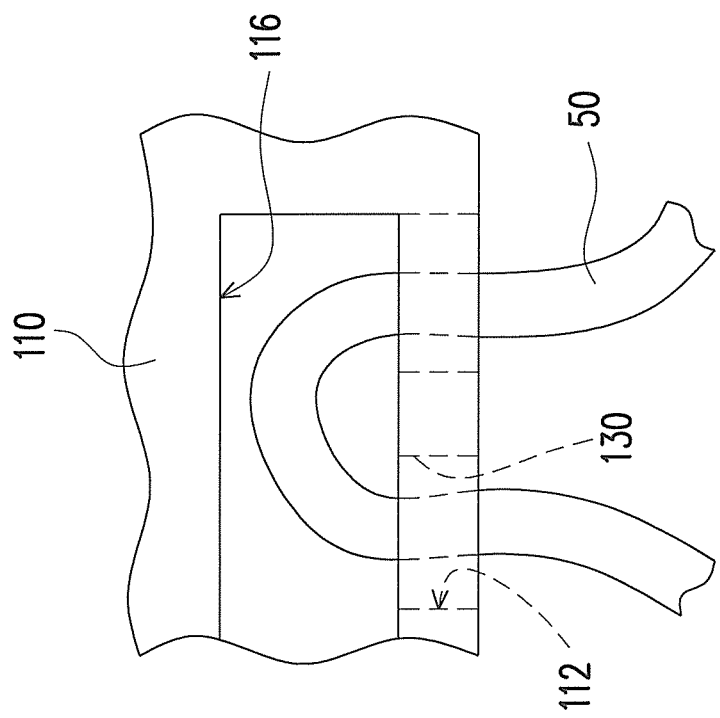
FIG. 4A and FIG. 4B are partially, top view of the main body of FIG. 2.
Figure 4B:
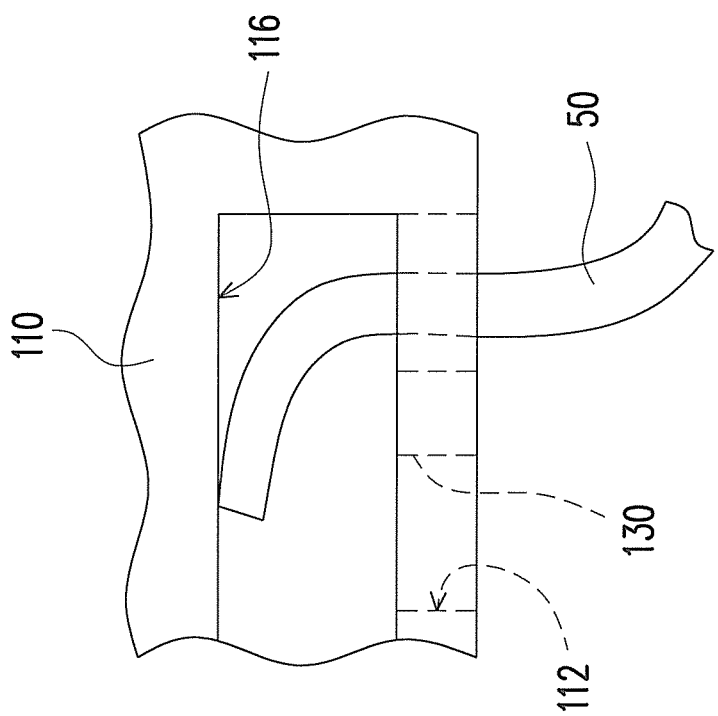

FIG. 4A and FIG. 4B are partially, top view of the main body of FIG. 2. Referring to FIGS. 4A and 4B, specifically, after the user removes the cover 120 from the main body 110 (as shown in FIG. 2), the user may slide the strap 50 from one side of the bar 130 into the strap hole 112 to the state shown in FIG. 4A. The user then may observe the extending direction and position of the strap 50 in the strap hole 112 through the observing hole 116, or use a tool to directly adjust the extending direction and position of the strap 50 through the observing hole 116. As shown in FIG. 4B, the strap 50 is extended out of the strap hole 112 from the other side of the bar 130, thereby completing the passing of the strap 50 through the strap hole 112.

Figure 5:
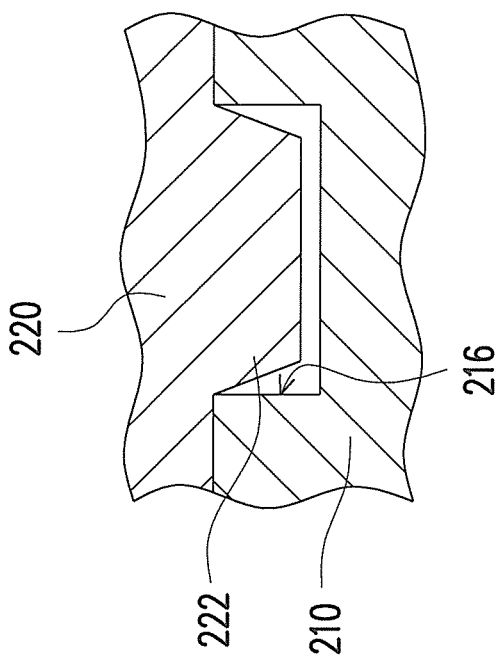
FIG. 5 is a partially, cross-sectional view of a handheld electronic device according to another embodiment of the invention.

FIG. 5 is a partially, cross-sectional view of a handheld electronic device according to another embodiment of the invention. Referring to FIG. 5, the observing opening 216 of the present embodiment may position the cover 220 in addition to allowing the user to observe or adjust the strap 50 as described above. In particular, in the present embodiment, the cover 220 includes a positioning protrusion 222. Once the cover 220 covers the main body 210, the positioning protrusion 222 is engagingly received in the observing opening 216 to position the cover 220.

Figure 6:
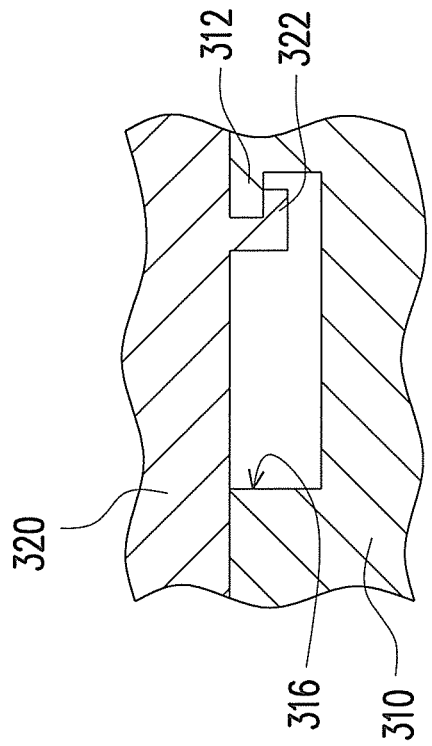
FIG. 6 is a partially, cross-sectional view of a handheld electronic device according to yet another embodiment of the invention.

FIG. 6 is a partially, cross-sectional view of a handheld electronic device according to still another embodiment of the invention. Referring to FIG. 6, similar to the observing opening 216 of FIG. 5, the observing opening 316 of the present embodiment has the function of positioning the cover 320. Specifically, in the present embodiment, the cover 320 includes a hook 322, and the main body 310 includes a rib 312 in the observing opening 316. When the cover 320 covers the main body 310, the hook 322 is engaged with the rib 312 to position the cover 320.

In summary, the above embodiments of the invention have at least one of the following advantages. The handheld electronic device has the observing opening aligned with and communicating with the strap hole. During the course of passing the charm strap through the strap hole by the user, the user may observe the strap in the strap hole through the observing opening, or adjust the position of the strap in the strap hole through the observing opening, thus facilitating the quick installing of the charm. In addition, the observing opening and the receiving slot are both positioned at the bottom surface of the main body. Therefore, after the strap has been passed through the strap hole, the cover used to cover the receiving slot may cover the observing opening. This avoids exposure of the observing opening which affects the appearance of the handheld electronic device. In addition, the observing opening and the cover may be configured to form a structural interference therebetween, thus enabling the observing opening to position the cover.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A handheld electronic device comprising:
    a main body having a bottom surface and a side surface adjacent to each other, wherein a strap hole is formed in the side surface of the main body, a receiving slot for receiving a battery and an observing opening are formed in the bottom surface, and the observing opening is located at an edge of the bottom surface and the observing opening is aligned and communicates with the strap hole, wherein the observing opening passes through the bottom surface;
    a cover detachably disposed on the bottom surface to completely cover the receiving slot and the observing opening, wherein the observing opening only faces the cover, wherein the cover has a hook, the main body has a rib in the observing opening, and the hook is engaged with the rib; and
    a bar connected between a top wall and a bottom wall of the strap hole.

2. The handheld electronic device according to claim 1, wherein the bar and the main body are integrally formed.

3. The handheld electronic device according to claim 1, wherein the receiving slot is a battery slot.

4. The handheld electronic device according to claim 1, wherein the cover has a positioning protrusion engagingly received in the observing opening.

* * * * *